US010605670B2

(12) United States Patent
Hofleitner

(10) Patent No.: US 10,605,670 B2
(45) Date of Patent: Mar. 31, 2020

(54) METHOD FOR DETERMINING A PERFORMANCE INDEX OF A COOKING VESSEL REPRESENTATIVE OF THE HOMOGENEITY OF TEMPERATURE

(71) Applicant: SEB S.A., Ecully (FR)

(72) Inventor: Céline Hofleitner, Annecy (FR)

(73) Assignee: SEB S.A., Ecully (FR)

( * ) Notice: Subject to any disclaimer, the term of this patent is extended or adjusted under 35 U.S.C. 154(b) by 0 days.

(21) Appl. No.: 16/074,292

(22) PCT Filed: Feb. 2, 2017

(86) PCT No.: PCT/FR2017/050237
§ 371 (c)(1),
(2) Date: Jul. 31, 2018

(87) PCT Pub. No.: WO2017/134390
PCT Pub. Date: Aug. 10, 2017

(65) Prior Publication Data
US 2019/0339132 A1    Nov. 7, 2019

(30) Foreign Application Priority Data
Feb. 4, 2016 (FR) ..................... 16 50916

(51) Int. Cl.
*A47J 27/00* (2006.01)
*G01K 1/02* (2006.01)
(Continued)

(52) U.S. Cl.
CPC ............ *G01K 1/026* (2013.01); *A47J 27/002* (2013.01); *A47J 36/32* (2013.01); *A47J 37/10* (2013.01); *G01B 21/32* (2013.01)

(58) Field of Classification Search
CPC ......... G01K 1/026; A47J 27/002; A47J 36/32; A47J 37/10; G01B 21/32
See application file for complete search history.

(56) References Cited

U.S. PATENT DOCUMENTS

| 1,548,489 A | * | 8/1925 | Sears | ...................... G01K 1/14 |
| | | | | 374/141 |
| 3,176,118 A | * | 3/1965 | Scott | ......................... F24C 7/06 |
| | | | | 219/394 |

(Continued)

FOREIGN PATENT DOCUMENTS

| BE | 904 460 A1 | 9/1986 |
| DE | 10 2010 027833 A1 | 10/2011 |
| WO | WO 2014/147319 A1 | 9/2014 |

OTHER PUBLICATIONS

International Preliminary Report on Patentability and the Written Opinion of the International Searching Authority as issued in International Patent Application No. PCT/FR2017/050237, dated Aug. 7, 2018.

(Continued)

*Primary Examiner* — Steven N Leff
(74) *Attorney, Agent, or Firm* — Pillsbury Winthrop Shaw Pittman LLP

(57) ABSTRACT

A method determines a performance index of a cooking vessel subjected to a heating power, the index being representative of the capacity of the vessel to distribute the heating power in a homogeneous manner, the vessel including a bottom and a lateral wall furnished with an external face. The method includes a) subjecting the bottom of the vessel to a heating system, b) measuring and recording at regular time intervals the temperature at least three points of predetermined altitude of the external face until the stabilization of at least one of the measured temperatures at each time interval at the level of the at least three points, c) calculating and recording in the course of the time taken for the temperature of the external face to rise, the difference between the maximum temperature and the minimum temperature measured, d) determining the performance index based on the calculations and recordings.

10 Claims, 2 Drawing Sheets

(51) Int. Cl.
*A47J 36/32* (2006.01)
*A47J 37/10* (2006.01)
*G01B 21/32* (2006.01)

(56) References Cited

U.S. PATENT DOCUMENTS

| | | | | |
|---|---|---|---|---|
| 3,293,411 A * | 12/1966 | Dills | ........................ | F24C 14/02 |
| | | | | 219/393 |
| 4,541,733 A * | 9/1985 | Andre | ................. | A47J 27/0802 |
| | | | | 126/388.1 |
| 5,048,400 A * | 9/1991 | Ueda | ..................... | A47J 27/092 |
| | | | | 99/332 |
| 6,283,014 B1 * | 9/2001 | Ng | ....................... | A47J 27/0802 |
| | | | | 219/431 |
| 6,580,056 B1 * | 6/2003 | Tacha | ........................ | B01L 7/00 |
| | | | | 219/440 |
| 7,586,065 B2 * | 9/2009 | Kehoe | ..................... | A47J 27/10 |
| | | | | 219/432 |
| 2005/0242086 A1 * | 11/2005 | Imura | ..................... | A47J 27/62 |
| | | | | 219/627 |
| 2006/0016801 A1 * | 1/2006 | Kitabayashi | ........... | F24C 15/325 |
| | | | | 219/497 |
| 2008/0142502 A1 * | 6/2008 | Bratcher | ................... | H05B 3/68 |
| | | | | 219/450.1 |
| 2012/0103966 A1 * | 5/2012 | Gladhill | ................ | H05B 1/0263 |
| | | | | 219/391 |
| 2013/0305933 A1 * | 11/2013 | Heidrich | ................ | A47J 36/321 |
| | | | | 99/331 |
| 2015/0208845 A1 | 7/2015 | Robbins et al. | | |

OTHER PUBLICATIONS

International Search Report as issued in International Patent Application No. PCT/FR2017/050237, dated May 10, 2017.

* cited by examiner

METHOD FOR DETERMINING A PERFORMANCE INDEX OF A COOKING VESSEL REPRESENTATIVE OF THE HOMOGENEITY OF TEMPERATURE

CROSS-REFERENCE TO RELATED APPLICATIONS

This application is the U.S. National Stage of PCT/FR2017/050237 filed Feb. 2, 2017, which in turn claims priority to French patent application number 1650916 filed Feb. 4, 2016. The content of these applications are incorporated herein by reference in their entireties.

This invention concerns a method for determining a performance index of a cooking vessel subjected to a heating power generated by heating means, said index being representative of the capacity of said cooking vessel to distribute the heating power in a homogeneous manner throughout the cooking vessel during the time necessary to cook foods, the cooking vessel being in particular a saucepan, a skillet or a Dutch oven.

The technical construction of commercially available cooking vessels within the same family may be very different from one cooking vessel to the next, but this difference is not visible to the consumer. Thus, they have a relatively similar exterior form, and the consumer has little information for comparing and assessing the cooking performance of two or more cooking vessels.

For example, a saucepan 20 centimeters in diameter may be manufactured from a sheet of stainless steel, a sheet of aluminum, or a sheet produced by assembling several layers, in particular stainless steel, aluminum or copper. When the cooking vessel is placed on heating means that provide a heating power to cook the foods contained in the cooking vessel, the distribution of power in the cooking vessel over time will be more or less homogeneous according to the technical construction.

The homogeneity of the distribution of the heating power over time will be reflected in more or less significant temperature differences between the hottest points and the coldest points of the cooking vessel. Thus, the smaller the temperature differences, the better the cooking quality of the foods.

The purpose of this invention is to propose for a given cooking vessel a method for determining a performance index representative of the capacity of said cooking vessel to distribute the heating power in a homogeneous manner throughout the cooking vessel over time and thus to permit the consumer to compare the cooking performance of two cooking vessels of different constructions.

Another purpose of the invention is to propose a method that is simple and economical to implement.

These purposes are achieved with a method for determining a performance index of a cooking vessel subjected to a heating power generated by heating means, said index being representative of the capacity of said cooking vessel to distribute the heating power in a homogeneous manner throughout the cooking vessel during the time necessary to cook foods, said cooking vessel comprising a bottom and a lateral wall finished with an external face, characterized in that it comprises the following steps:
  a) subjecting the bottom of the cooking vessel to heating means turned on at a determined heating power, the heating of the bottom causing an elevation in the temperature of the external face of the lateral wall,
  b) measuring and recording at regular time intervals the temperature at least three points at predetermined height on the external face during the heating of the cooking vessel until the stabilization of at least one of the measured temperatures,
  c) calculating and recording, during the heating-up time of the external face, the difference between the maximum temperature and the minimum temperature measured at each time interval at least three points.
  d) determining the performance index on the basis of the calculations and recordings carried out.

The applicant has shown that a performance index based on temperature measurement on the external face of the lateral wall was as relevant as a performance index based on measurement of temperature on an internal face of the vessel, in particular of the lateral wall.

Measurement of the temperature on the external face of the lateral wall is easy to accomplish, in particular if the cooking vessel contains food. In fact, it is easy to access the external face for placement of measuring means.

By measuring and recording the temperature at least three points at predetermined height on the external face, in particular in the event the cooking vessel contains viscous foods, it is possible to avoid convective motion disturbances in the vessel.

Advantageously, in step b), the three temperature measurement points are aligned on a vertical axis.

Because cooking vessels are generally cylindrical, the vertical axis represents a line of progression of the heat flow. Thus, the measurement of temperature over time at least three points along the vertical axis makes it possible to know the progression of the heat flow.

Preferably, in step b), three temperature probes are implemented in contact with the external face, connected to a measurement acquisition unit.

This arrangement permits the implementation of very economical components, as each temperature probe comprises a temperature sensor, in particular an NTC or a thermocouple, which are commercially available components. NTC means Negative Temperature Coefficient thermistor.

Advantageously, in step b), a temperature measurement device is implemented without contact with the external face, in particular a thermal camera.

This arrangement permits quickly implementing the method for several cooking vessels, once the thermal camera is configured. This arrangement also permits increasing the number of measuring points or having a measurement and analysis on a given surface.

Preferably, before step a), the cooking vessel is filled to at least two-thirds of its capacity, in particular with a viscous fluid.

This arrangement permits determining a performance index in conditions close to the conditions of use.

Advantageously, in step d), the largest difference between the maximum temperature and the minimum temperature recorded at each time interval in step c) is determined, the performance index of the cooking vessel being equal to said largest difference.

This arrangement permits simply and easily determining a relevant performance index.

Preferably, in step d), the average difference between the maximum temperature and the minimum temperature recorded at each time interval during the heating-up time of the external face is calculated, the performance index of the cooking vessel being equal to the average.

This arrangement permits determining a performance index that takes into account the temperature differences during the entire heating-up time of the cooking vessel.

Advantageously, in step b), the external face of the vertical wall is vertically divided into three equal parts, the three temperature measurement points corresponding to the center of each part according to a vertical axis.

Preferably, in step b), the time interval for measuring and recording the temperature is one second.

Such a time interval is short enough to record the temperature progression properly along the external face of the lateral wall.

Advantageously, the cooking vessel is a saucepan, a skillet or a Dutch oven.

The method is particularly well suited to such cooking vessels having a lateral wall 30% higher than the diameter of the bottom.

The invention will be more fully understood in consideration of the embodiment, which is in no way restrictive, illustrated in the attached figures, in which.

Note that, in this document, the terms "horizontal," "vertical," "lower," "upper," "top" and "bottom" used to describe the cooking vessel refer to this cooking vessel in a use situation, when it is placed on heating means or on a horizontal plane.

The method implemented determines a performance index of a cooking vessel 1a, 1b subjected to the heating power generated by heating means 20. This index is representative of the capacity of the cooking vessel 1a, 1b to distribute the heating power in a homogeneous manner throughout the cooking vessel during the time necessary to cook foods.

Figure 1:
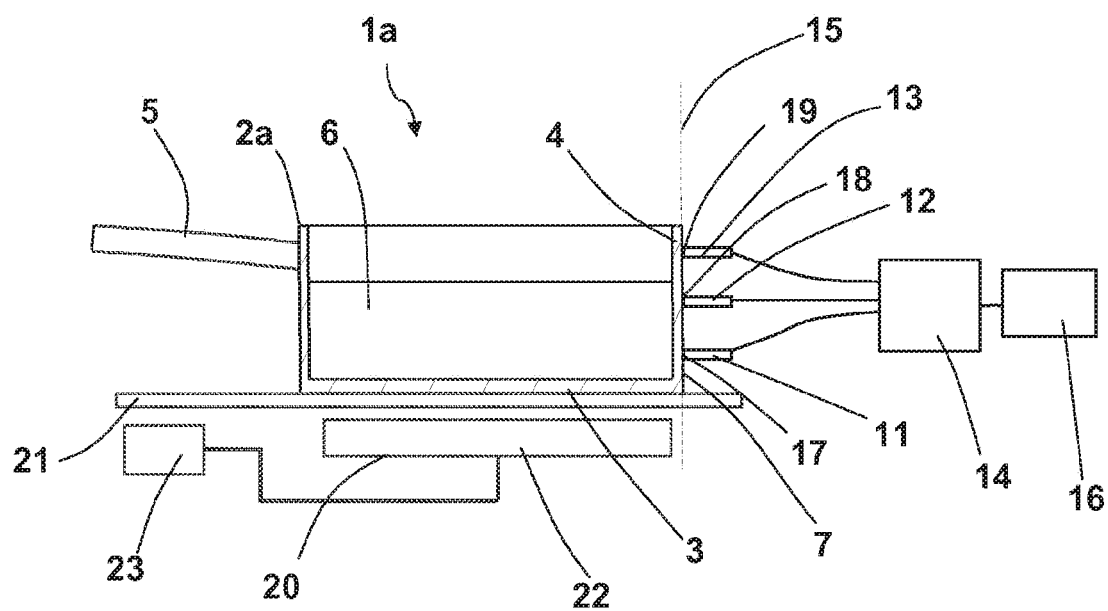
FIG. 1 is a schematic cross-sectional view of a cooking vessel according to a particular first embodiment of the invention.
Figure 2:
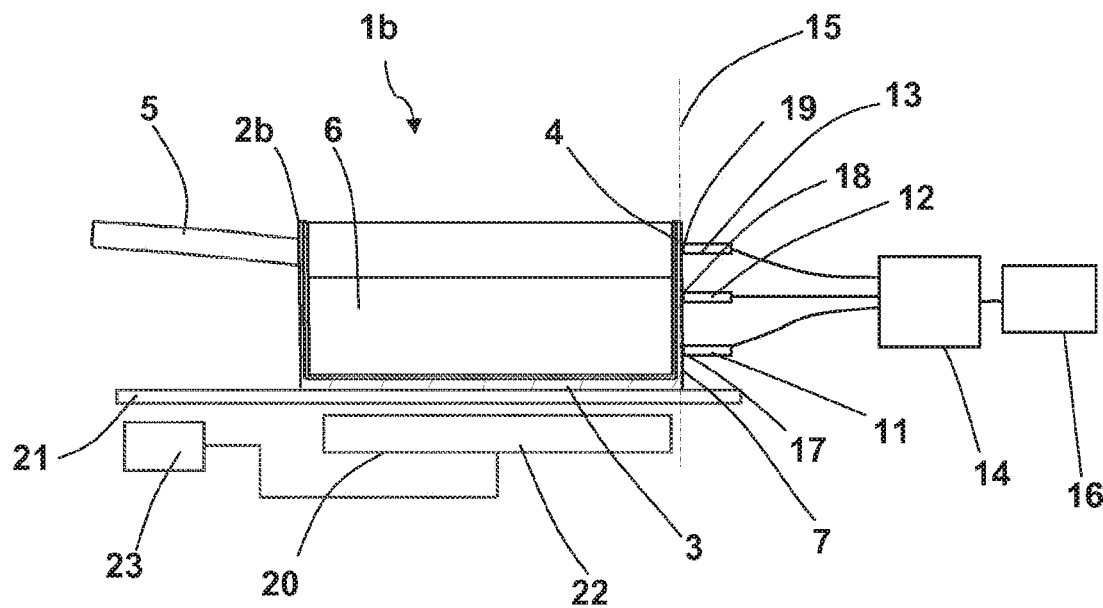
FIG. 2 is a schematic cross-sectional view of a cooking vessel according to a particular second embodiment of the invention.

As visible in FIGS. 1 and 2, the method is implemented to determine the performance index of a first 1a and a second 1b cooking vessel of the same size: a saucepan 20 centimeters in diameter, but with two different constructions. The first cooking vessel 1a comprises a cap 2a made from a layer of stainless steel 0.6 millimeters thick, for example by striking a sheet of stainless steel. The second cooking vessel 1b comprises a cap 2b made from two superimposed layers: a stainless steel layer 0.6 millimeters thick and an aluminum layer 2 millimeters thick. The first cooking vessel 1a and second cooking vessel 1b comprise a bottom comprising an aluminum plate encased in a stainless steel cap applied by striking (not illustrated on the figures).

Each cap 2a, 2b comprising a bottom 3 and a lateral wall 4 equipped with a handle 5. Each cooking vessel 1a, 1b is filled to two-thirds of its capacity with a viscous liquid 6, such as soup.

Each cooking vessel 1a, 1b rests on the heating means 20, in particular with electric heating resistors, which include a glass ceramic plate 21, a heating device 22, in particular a hot pot, and a control device 23.

The lateral wall 4 of each cooking vessel 1a, 1b comprises an external face 7 on which are arranged three temperature probes 11, 12, 13, connected to a measurement acquisition unit 14. The three temperature probes 11, 12, 13 each comprise a temperature sensor formed by a thermocouple. The external face 7 of the vertical wall 4 is vertically divided into three equal parts, the temperature probes 11, 12, 13 are positioned, respectively, at a point 17, 18, 19 corresponding to the center of each part according to a vertical axis 15. The measurement acquisition unit 14 is connected to a computer 16.

The method includes the following steps:
a) subjecting the bottom 3 of the cooking vessel 1a, 1b to heating means 20 turned on at a heating power of 600 watts using the control device 23, the heating of the bottom 3 causing an elevation in the temperature of the external face 7 of the lateral wall 4,
b) measuring with the three probes 11, 12, 13 and recording every second the temperature at three points 17, 18, 19 at predetermined height on the external face 7 during heating of the cooking vessel 1a, 1b until the stabilization of at least one of the measured temperatures,
c) calculating and recording, during the heating-up time of the external face 7, the difference between the maximum temperature and the minimum temperature measured at each time interval at least three points.
d) determining the largest difference between the maximum temperature and the minimum temperature recorded at each time interval, the performance index of the cooking vessel 1a, 1b, being equal to this largest difference.

Figure 3:
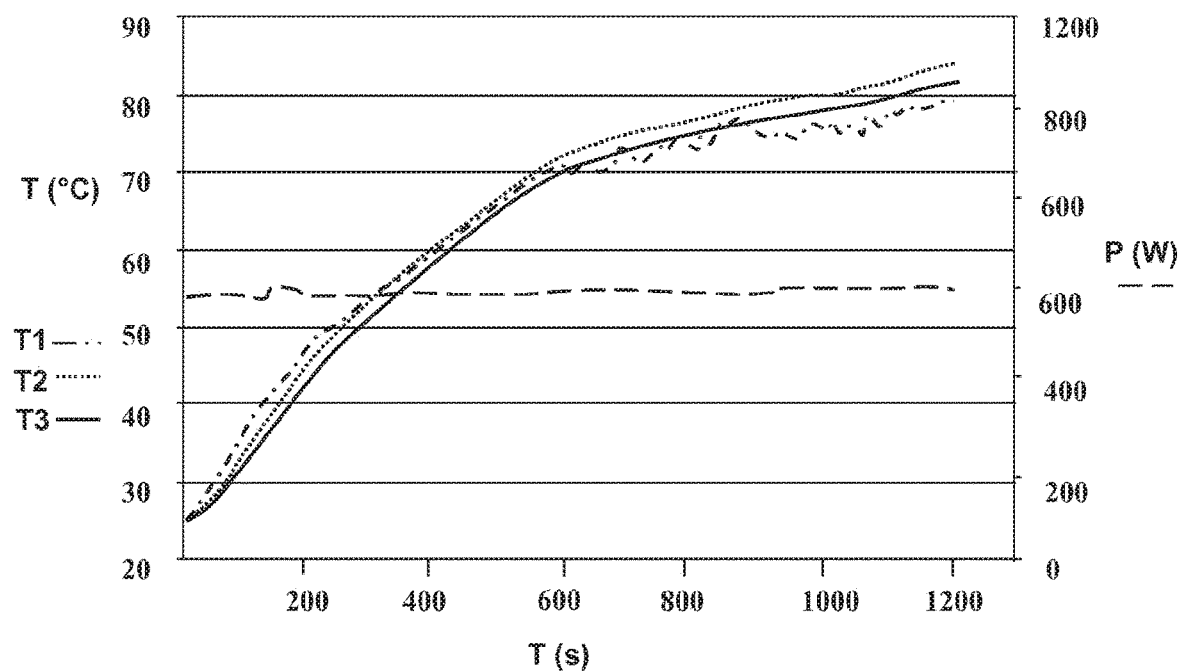
FIG. 3 is a graph of the evolution of the three temperatures measured and of the power as a function of time for a cooking vessel comprising a stainless steel layer and an aluminum layer.

FIGS. 2 and 3 each illustrate a graph of recordings made by the measurement acquisition unit 14 during implementation of the method for, respectively, the first 1a and the second 1b cooking vessel. For each graph, the horizontal axis represents the time in seconds, the right vertical axis represents the temperature measured on the external face 7 in degrees Celsius and the left vertical axis represents the heating power to which the bottom 3 of the cooking vessel 1a, 1b is subjected.

Each graph includes a curve corresponding to the recording of the heating power. In this way, it is possible to verify that the heating power to which the bottom 3 of the cooking vessel 1a, 1b is subjected is indeed constant and equal to 600 watts.

Each graph also includes three curves corresponding to the recording of the three temperature probes 11, 12, 13: the curve referenced as T1 corresponds to the temperature probe 11 placed at the bottom of the external face 7, the curve referenced as T2 corresponds to the temperature probe 12 placed in the middle of the external face 7 and the curve referenced as T3 corresponds to the temperature probe 13 placed at the top of the external face 7.

The measurement acquisition unit 14 measures and records the temperature measured by the three probes during heating of the cooking vessel until the stabilization of at least one of the temperatures measured. Stabilization of a temperature means that the temperature does not progress by more than 5° C. in 60 seconds.

The measurement acquisition unit 14 is connected to a computer 16 which will record, every second during the heating-up time of the external face of the lateral wall, the difference between the maximum temperature and the minimum temperature among the temperatures measured on the three probes. Thus, the difference between the maximum temperature and the minimum temperature will be chosen from among the values (T1−T2), (T1−T3), (T2−T3). The performance index of the cooking vessel is equal to the largest difference recorded during the heating-up time of the external face 7.

As visible in FIG. 3, the first cooking vessel 1a presents grouped temperature curves. The performance index for this first cooking vessel 1a is 5, corresponding to the largest recorded difference of 5° C. On FIG. 3, this temperature difference peak is visible between the curves T1 and T2 at the moment T≈1000 seconds.

Figure 4:
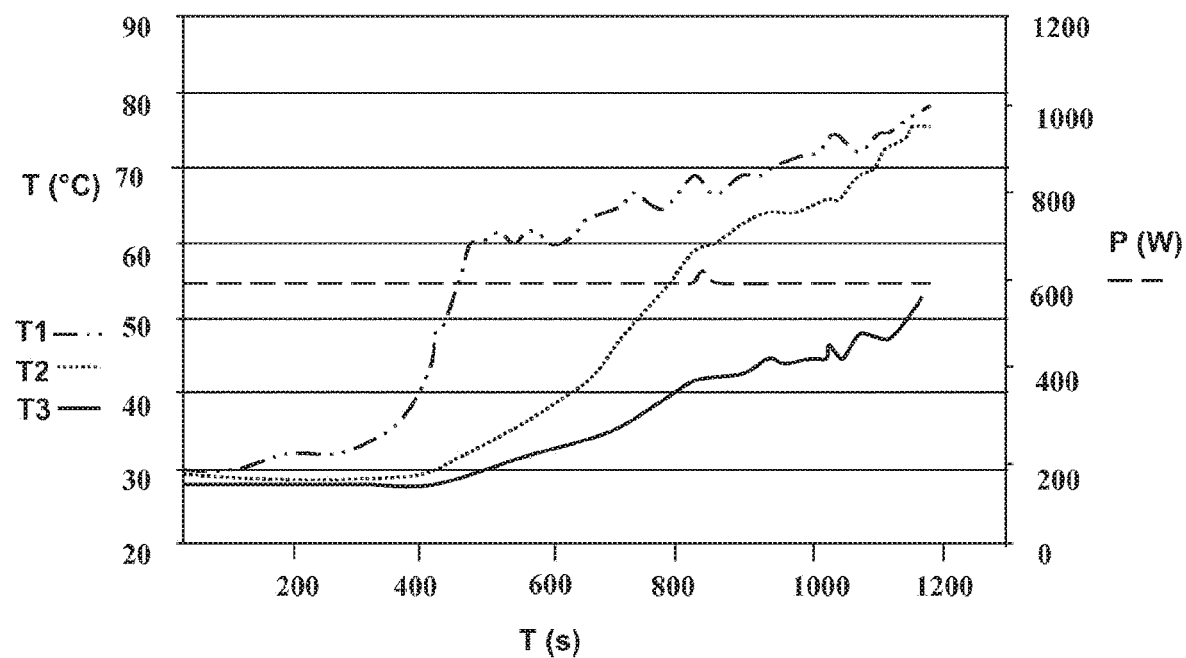
FIG. 4 is a graph of the evolution of the three temperatures measured and of the power as a function of time for a cooking vessel comprising a stainless steel layer.

As visible on FIG. 4, the second cooking vessel 1b has temperature curves that evolve very differently. The performance index for this second cooking vessel 1b is 30, corresponding to the largest recorded difference of 30° C. between the temperatures measured by the three probes. On FIG. 4, the maximum measured temperature difference is measured between the curves T1 and T3 at the moment T≈500 seconds.

Note that on the graph illustrated in FIG. 3 the curves cross each other and the difference between the maximum temperature and the minimum temperature is not obtained between the same two curves over time. This shows the benefit of using three temperature probes to determine the performance index.

If we consider that the method implemented on the family of cooking vessels of saucepans 20 centimeters in diameter yields a performance index scale from 3 to 50, the consumer will be able to understand that the first cooking vessel 1a with an index of 5 has the capacity to distribute the heating power very well in a homogeneous manner throughout the cooking vessel over time and guarantees that the foods will be cooked properly. With a performance index of 30, the consumer will be able to understand that the second cooking vessel 1b has a moderate to low capacity to distribute the heating power.

Of course, the invention is in no way limited to the embodiments described, which have been provided only as examples. Modifications are still possible, in particular from the point of view of composition of the various components or by substitution of equivalent techniques, without departing from the scope of protection of the invention.

Thus, in an implementation variant, induction heating means are used to determine a performance index of a cooking vessel compatible with such a heating means.

The invention claimed is:

1. A method for determining a performance index of a cooking vessel configured to be placed on top of a heating system and subjected to a heating power generated by the heating system, said index being representative of the capacity of said cooking vessel to distribute the heating power in a homogeneous manner throughout the cooking vessel during the time necessary to cook foods, said cooking vessel comprising a bottom and a lateral wall finished with an external face the method comprising:

a) subjecting the bottom of the cooking vessel to a heating system turned on at a determined heating power, the heating of the bottom causing an elevation in the temperature of the external face of the lateral wall,
b) measuring and recording at regular time intervals the temperature at at least three points at predetermined height on the external face during heating of the cooking vessel until the stabilization of at least one of the measured temperatures, wherein the measuring the temperature comprises measuring with a thermal camera without contact with the external face,
c) calculating and recording, during the heating-up time of the external face, a difference between a maximum temperature and a minimum temperature measured at each time interval at at least three points,
d) determining the performance index on the basis of the calculations and recordings carried out in step c).

2. The method according to claim 1, wherein in step b), the three temperature measurement points are aligned on a vertical axis.

3. The method according to claim 1, wherein in step b), three temperature probes are implemented in contact with the external face, connected to a measurement acquisition unit.

4. The method according to claim 1, wherein before step a), the cooking vessel is filled to at least two-thirds of its capacity.

5. The method according to claim 4, wherein the cooking vessel is filled with a viscous fluid in contact with an internal face of the lateral wall.

6. The method according to claim 1, wherein in step d), the largest difference between the maximum temperature and the minimum temperature recorded at each time interval in step c) is determined, the performance index of the cooking vessel being equal to said largest difference.

7. The method according to claim 1, wherein in step d), an average difference between the maximum temperature and the minimum temperature recorded at each time interval during the heating-up time of the external face is calculated, the performance index of the cooking vessel being equal to the average.

8. The method according to claim 1, wherein in step b), the external face of the lateral wall is divided into three equal parts, the three temperature measurement points corresponding to a center of each part according to a vertical axis.

9. The method according to claim 1, wherein in step b), the time interval for measuring and recording the temperature is one second.

10. The method according to claim 1, wherein the cooking vessel is a saucepan, a skillet or a Dutch oven.

* * * * *